Patented Jan. 14, 1936

2,027,535

UNITED STATES PATENT OFFICE 2,027,535

CLEANING AND POLISHING COMPOSITION

Bernard H. Jacobson, Charleston, W. Va., assignor to Klipstein Chemical Processes, Inc., New York, N. Y., a corporation of New Jersey No Drawing. Application February 28, 1933, Serial No. 658,941

4 Claims. (Cl. 167—93)

This invention relates more particularly to tooth pastes, but is applicable in a general way to various types of cleaning and polishing compositions in liquid, plastic or solid form such as tooth powder, soaps, furniture polish and the like.

The invention is based upon the discovery that finely divided anthraquinone, and particularly anthraquinone paste, possesses valuable properties as a scouring or polishing abrasive for use in removing surface films of foreign matter from base material which would be unable to withstand the action of the usually hard mineral powders such as emery, pumice, chalk and the like.

In the commercial product, known in the trade as anthraquinone paste, as supplied for cotton printing and similar uses, the particles of anthraquinone are in the form of very small and very sharp fragments of crystals which are of a moderate degree of hardness so that they may serve as a good abrasive or scouring ingredient for the removal of films which are of only a moderate degree of hardness, such as, for example, the film which forms on human teeth. At the same time, the hardness of the particles of anthraquinone is so much less than that of the enamel or dentine that the material may be used with entire safety. Being insoluble in water and in the fluids of the mouth and the alimentary tract in general, the material is harmless to the human system when used as an ingredient in a dental paste. Furthermore, due to the insolubility of the material in water, and in the common vehicles in which such abrasive powders are incorporated for various uses, the sharpness of the fragments is not lost during the compounding of the mixture or composition. The melting point is sufficiently high to withstand any ordinary heating requirements incidental to the preparation of the composition.

In making the various preparations, the dry anthraquinone powder may be used, but in most cases I prefer to use the already prepared anthraquinone paste with which the cotton printing trade is familiar. This paste, being in the form of a water suspension of anthraquinone particles or fragments closely approximating the colloidal state, offers certain advantages in the incorporation of the anthraquinone with the other ingredients of the composition to be prepared, since it flows and mixes readily and uniformly with the other ingredients.

The preparation of a tooth paste may, for example, be illustrated by the following compositions, in which the parts are given by weight:—

I

| | |
|---|---|
| Glycerol | 25 |
| Soap | 5 |
| Cornstarch | 5 |
| Sodium benzoate | 2 |
| Oil of peppermint | 1 |
| Anthraquinone dry | 45 |
| Water | 17 |

II

| | |
|---|---|
| Glycerol | 20 |
| Soap | 5 |
| Cornstarch | 5 |
| Sodium benzoate | 2 |
| Oil of peppermint | 1 |
| Anthraquinone paste (30%) | 67 |

In the above examples of tooth paste, I have made no attempt to represent more than what might be termed typical standard compositions with the anthraquinone embodied as the scouring or polishing ingredient. Obviously, many other compositions and proportions could equally well be recited, and many substitutes for the various ingredients given by way of example will be apparent to those skilled in this art.

A satisfactory soap composition may be produced by mixing the anthraquinone powder or anthraquinone paste with any of the standard soap flakes or soap powders, together with a little water, and heating the mixture until the ingredients have become thoroughly distributed and a homogeneous paste is obtained, after which the mass may be poured into molds or allowed to cool and pressed into cakes of suitable form, or otherwise brought into the shape desired. Using anthraquinone paste of 30% strength, i. e. an aqueous suspension with 30% anthraquinone, I have found satisfactory for hand soap, compositions running from 15 grams ordinary soap flakes, 45 grams anthraquinone paste, and 10 ccs. water, to 15 grams soap flakes, 10 grams anthraquinone paste, and 20 ccs. water. The anthraquinone powder or anthraquinone paste may, on the other hand, be introduced into the soap mixture during the commercial production of soap by the saponification of fats. Such addition of anthraquinone during the soap production is preferably effected in the crutcher.

The anthraquinone paste has the incidental advantage of conferring a smooth or creamy consistency upon the various compositions in which it is employed, due apparently to the extremely small size of the particles of anthraquinone.

The particular vehicle with which the anthraquinone is associated will obviously vary with the different uses to which the invention is put. In general, it may be readily incorporated with soaps, oils, greases, waxes, gums, gels and the like, or it may even be used directly in the form of a water suspension. The proportions may be varied almost at will, depending upon the consistency desired or the effect sought.

I claim:—

1. A dentifrice comprising a supporting paste vehicle and finely divided crystalline anthraquinone uniformly distributed therein.

2. A dentifrice comprising as essential ingredients a soap, and finely divided crystalline anthraquinone uniformly distributed therewith.

3. A dentifrice comprising a cornstarch paste vehicle and finely divided crystalline anthraquinone uniformly distributed therein.

4. A dentifrice comprising as essential ingredients a supporting cornstarch and soap paste vehicle and finely divided crystalline anthraquinone fragments uniformly distributed therein.

BERNARD H. JACOBSON.